Patented July 7, 1931

1,813,344

UNITED STATES PATENT OFFICE

IRA H. DERBY AND ORIN D. CUNNINGHAM, OF INDIANAPOLIS, INDIANA, ASSIGNORS TO PETER C. REILLY, OF INDIANAPOLIS, INDIANA

FROTH FLOTATION OF ORES

No Drawing. Application filed November 17, 1928, Serial No. 320,207. Renewed February 19, 1931.

This invention pertains to reagents suitable for use in the collection or concentration of minerals by the froth-flotation process, and in the method of making such reagents and also the use of these reagents in flotation.

The invention is based upon the discovery that many organic salts, such, for example, as the sodium salts of the cresols, react at low temperatures with phosphorus sulfides such, for example, as phosphorus trisulfide ($P_2S_3$), and phosphorus pentasulfide ($P_2S_5$), to form a new class of substances having very effective froth-flotation collection properties.

As illustrating our discovery or invention, the reaction of sodium cresylate (para) with phosphorus pentasulfide ($P_2S_5$) may be noted. This reaction takes place even at a low temperature, say at 25° C., according to the following equation:

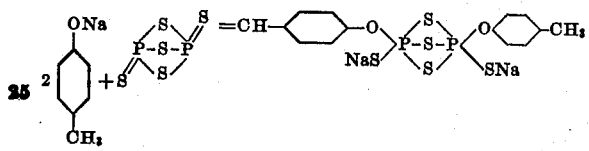

a reaction in which phosphorus pentasulfide, which may be regarded as thio-phosphoric acid anhydride, is converted into a salt of an organic thio-phosphoric acid derivative, by the direct addition of two molecules of the sodium salt, in this case sodium cresylate.

We have found that, in producing this type of product, a salt of the organic compound, (preferably the alkali metal salt or alkaline earth metal salt) is necessary to bring about this type of reaction; that is, para-cresol, for example, in contrast to its sodium salt, cresol, does not react with phosphorus pentasulfide ($P_2S_5$) at 25° C. or even at 50° C. to form a free acid derivative of the above described type. The term "alkaliforming metal" embraces alkali metals and alkaline earth metals.

It is known that cresol and phosphorus pentasulfide, at higher temperatures than those just noted (say at 125° C. or thereabout), react to form a flotation reagent of a quite different chemical structure, the reaction at such higher temperature being according to the following equation:

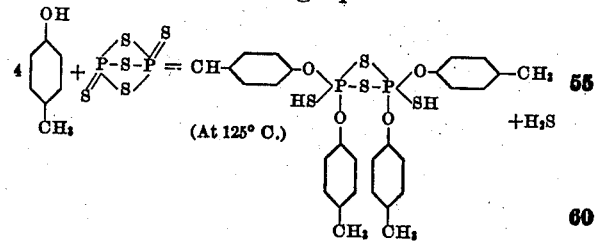

with possibly the further reaction of

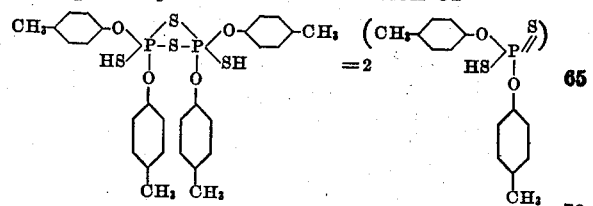

but we employ the sodium salt or cresol in the preparation embodying our invention, and this gives a different type of reaction with phosphorus pentasulfide, as is evidenced by the much lower temperature of reaction and the absence of hydrogen sulfide as a product of the reaction, and the formation of a quite different product, with different properties. The reaction products constitute a new class of organic thiophosphoric acid salt compounds, having excellent collecting properties as a flotation reagent.

The organic compounds which enter into this new type of reactions with phosphorus pentasulfide, according to our invention, include particularly the alkali metal salts and alkaline earth metal salts of such organic compounds as come under the following general classifications:

(1) Phenolic compounds, e. g. phenol, the cresols, tar acid, or the like;

(2) The aliphatic alcohols, e. g. ethyl alcohol;

(3) The cyclic alcohols, for example hexahydrophenol and the products of hydrogenation of the cresols, tar acids, and the like;

(4) The aliphatic and the aromatic mercaptols e. g. as ethyl mercaptol and phenyl mercaptol, respectively;

(5) The aliphatic and aromatic carboxylic acids, for example, acetic acid, and benzoic acid, respectively; and (6) The organic carbonic acid derivatives, such, for example, as the thiocarbonic acid compounds, xanthic acid, ethyl trithiocarbonic acid.

The reaction of most of the above substances with phosphorus pentasulfide takes place readily at temperatures as low as 10° C. or thereabout, and in some cases with a noticeable heat of reaction, so that the temperature needs to be controlled by cooling and by the rate of bringing the reacting substances together, it being preferable to maintain the temperature of reaction as low as practicable. It is essential, also, that the reacting materials be used free from water, since water readily enters into a side reaction with phosphorus pentasulfide to form phosphoric acids and hydrogen sulfide.

As specific examples, the following successfully used methods are given for preparing the class of organic thiophosphoric acid salt flotation reagents of this discovery, but without restricting the invention to these examples. (The parts are by weight.)

*Example 1.*—To 10 parts of a 24% solution of sodium cresylate in anhydrous tar acid at 25° C., add 2 parts of dry finely divided phosphorus pentasulfide ($P_2S_5$) and stir the mixture until a homogeneous solution is obtained, the reaction temperature not being allowed to rise much above 25°C. The reaction takes place readily and may be considered as complete when the mixture becomes homogeneous.

The syrupy liquid product, thus obtained, constitutes a flotation reagent possessing both frothing and collecting properties. The relative frothing and collecting properties of the mixture may be controlled by varying the relative proportions of the tar acid solvent medium and the sodium cresylate, from which later is formed the new compound in the final product. The amount of tar acid used, and which functions both as a solvent and as a reacting medium, may be varied at will so long as there is sufficient present for the reaction, it being preferable to use enough to leave the reaction product in a liquid condition.

*Example 2.*—To 10 parts of a 25% solution of sodium ethylate in anhydrous ethanol, slowly add 4 parts of phosphorus pentasulfide and stir constantly during the reaction, which takes place at 0°–10° C. or thereabout. The reaction takes place quickly and may be said to be complete when the reaction mixture has become homogeneous.

The thin syrupy liquid product, thus obtained, may be used directly as a flotation reagent (the alcohol, present as a solvent medium, serving as a frothing agent), or said product may be reduced to a more concentrated form by a vacuum distillation.

Instead of the sodium salt of ethanol given in the above example, we may use any one of the alkali or alkaline earth metal salts, such for instance, as the potassium or the calcium salts, with equally good results.

Instead of using the 4 parts of phosphorus pentasulfide in this example we may use the molecular equivalent of phosphorus trisulfide (2.84 parts), and obtain a product possessing good flotation action.

*Example 3.*—The reaction of sodium-ethyl mercaptan and phosphorus pentasulfide, according to our invention, may be carried out in ethanol as the reaction medium as follows:

4.0 parts of phosphorus pentasulfide are slowly added to 10 parts of a 30% solution of sodium-ethyl mercaptan in absolute alcohol, with constant agitation of the solution, the reaction being conducted at a temperature of 0–10° C. The reaction takes place quickly and may be said to be complete when the reaction mixture becomes homogeneous.

The syrupy liquid product, thus obtained, is advisably used as a flotation agent shortly after preparation, as it is somewhat unstable unless kept at a low temperature.

The other classifications of substances referred to above can be used in a similar manner. Thus instead of the alcoholic solution of sodium-ethyl mercaptan in Example 3, we could use alcoholic solutions (or mixtures) of sodium acetate, sodium benzoate, sodium salt of hexahydro phenol, sodium salts of hydrogenated tar acids (or other hydrogenated phenols) sodium salt of trithiocarbonic acid, sodium xanthate, etc., in about chemically equivalent proportions, viz., about 2 molecules of the sodium salt to one molecule of the $P_2S_5$.

In the above examples we have referred principally to the use of $P_2S_5$ but we desire to state that $P_2S_3$ can be used in a precisely similar manner, in chemically equivalent amounts, the same mode of treatment, same temperatures, etc., being suitable. (7 parts of $P_2S_5$ being equivalent to about 5 parts of $P_2S_3$, The present case is a continuation in part of matter described in our copending application Serial Number 96,061, filed March 19th, 1926.

In this case we have described the use of alkali metal salts and alkaline earth metal salts of phenols, alcohols, mercaptolic substances, hydrogenated phenols, and carboxylic acids, as substances to react with phosphorus sulphides to form a flotation reagent. We have given several examples of such salts of phenols, etc., which are operative for the purpose, and we believe that salts of certain closely related phenols, etc., can be used, though there are others that will not serve. The expressions "salts of phenols", etc., as used in this case are accordingly to be construed as covering the examples given herein and products so related thereto as to function in alike manner.

The general procedure outlined in the above examples may be followed in combining phosphorus pentasulfide with any of the compounds included in the classification of compounds already outlined herein, most of these reactions taking place readily at 10° C. or thereabout, in the presence of some inert organic liquid substance (such as ethanol), to serve as a solvent medium.

It is to be understood that the reagent is applicable to the recovery of a wide range of minerals and ores, such as sulfide ores and the like, by the flotation process.

The products obtained in the above example have been practically employed as collecting agents (also possessing some frothing action), in the froth flotation concentration of a copper sulfide ore of the Utah Copper Company, in the ratio of 0.025–0.50 pound of such product per ton of dry ore, with pine oil as a frothing agent, and a lime circuit being employed in conjunction therewith. The flotation operation is carried out in a mechanical type of flotation cell and results in approximately a 90% recovery of copper, in the form of a high grade concentrate.

The flotation reagents of this invention can be used on various ores, and larger or smaller amounts of the reagents than above noted may be used, the ratio depending on the type of ore and other variable conditions. Instead of pine oil, any other suitable frothing agent may be used where frothing action in excess of that afforded by the collecting reagent employed, is needed. Furthermore, any type of flotation cell may be employed, or, instead of an alkaline circuit contemplated in the above example, a neutral or acid circuit may be employed.

Furthermore, we do not limit the organic thiophosphoric acid products of our invention to the salts of these acids only, but include the free acid compound as well and the process of making the same, the free acid being obtainable by the reaction of an acid (preferably anhydrous), such as hydrogen chloride and acetic acid, on the organic thiophosphoric acid salts.

We claim:

1. In the art of concentrating ores and minerals by froth flotation, the step of subjecting the ore, in the form of a pulp, to a froth flotation operation in the presence of an organic compound having the structural formula

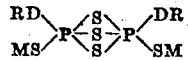

in which D represents a diad element, oxygen or sulphur, R represents an aryl, alkyl, hydrogenated aryl or acyl radical, and M represents an alkali-forming metal.

2. In the art of froth flotation, the herein described step of subjecting material to flotation in the presence of a compound formed by reacting phosphorus sulphide, at 25° C. or thereabout, with an alkali-forming metal compound of an organic substance, selected from the herein described class consisting of phenols, aliphatic alcohols, cyclic alcohols and other hydrogenation products of phenols, aliphatic and aromatic mercaptols, carboxylic acids and derivatives of carboxylic acids.

3. In the art of concentrating by froth flotation, the step of floating material in the presence of a compound formed by reacting with phosphorus sulphide, at 25° C. or thereabout, upon an alkali-forming metal compound of an hydroxy organic compound.

4. In the art of concentrating by froth flotation, the step of floating material in the presence of a compound formed by reacting with phosphorus sulphide, at 25° C. or thereabout, upon an alkali-forming compound of a phenol.

5. In the art of concentrating by froth flotation, the step of floating material in the presence of a compound formed by reacting with phosphorus sulphide, at 25° C. or thereabout, upon an alkali-forming compound of tar acid.

6. In the art of concentrating by froth flotation, the step of floating material in the presence of a compound formed by reacting with phosphorus sulphide, at 25° C. or thereabout, upon an alkali-forming compound of alcohol.

7. In the art of concentrating by froth flotation, the step of floating material in the presence of a compound formed by reacting with phosphorus sulphide, at 25° C. or thereabout, upon an alkali-forming compound of an hydrogenated phenol.

8. In the art of concentrating by froth flotation, the herein described step of floating a material in a comminuted form in the presence of a flotation reagent formed by reacting with phosphorus sulphide, at 25° C. or thereabout, upon the sodium salt of tar acid.

In testimony whereof we have signed our names to this specification.

IRA H. DERBY.
ORIN D. CUNNINGHAM.